3,157,849
BRUSHLESS VARIOMETER FOR AN EXTENDED
FREQUENCY RANGE
Rudolf Michler, Berlin-Siemensstadt, Germany, assignor to Siemens & Halske Aktiengesellschaft, Berlin and Munich, a corporation of Germany
Filed Nov. 24, 1961, Ser. No. 154,428
Claims priority, application Germany Dec. 2, 1960
4 Claims. (Cl. 336—150)

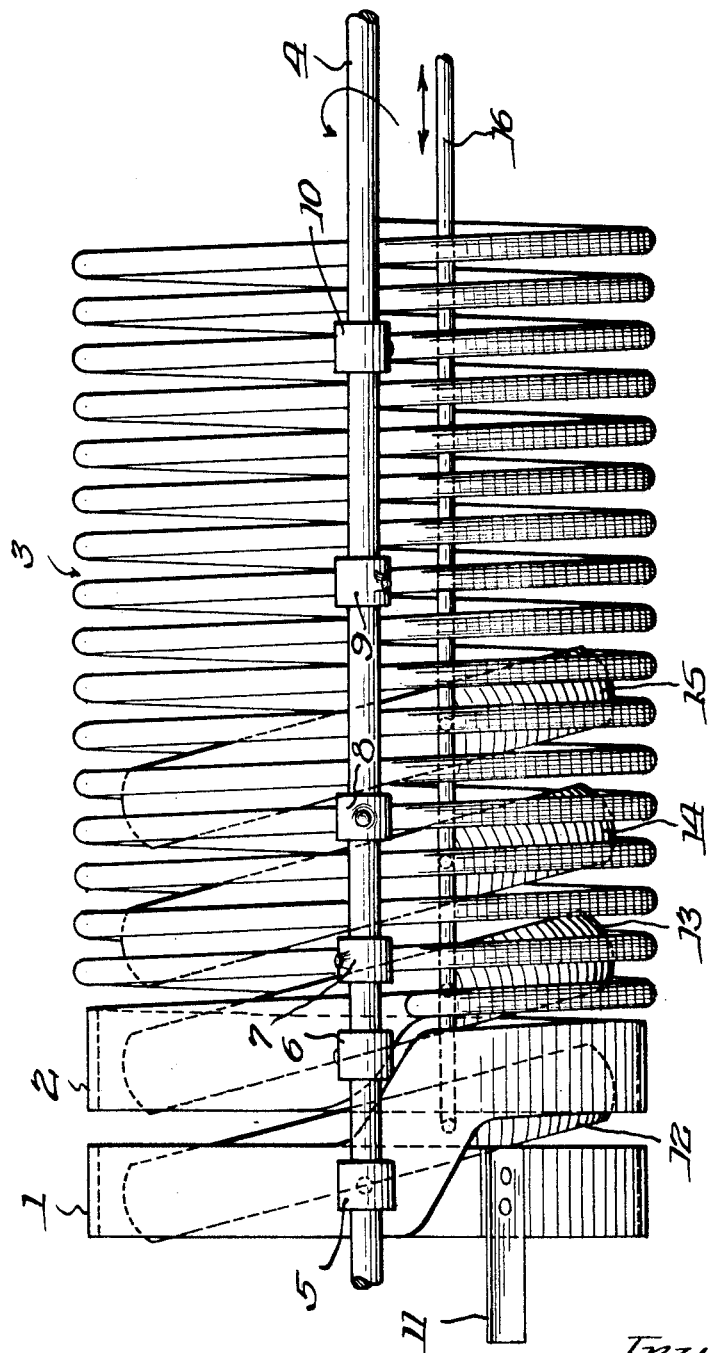

This invention is concerned with a brushless variometer for an extended frequency range, wherein inductance values are altered continuously by the actuation of shunt rings while being altered in stages under control of range switching means. In variometers of this kind, there appears in the case of uniform winding structure the difficulty that individual inductance ranges do not overlap and, accordingly, that given inductance values are not adjustable.

The object of the invention is to overcome these difficulties and to bridge the gaps in the inductance ranges occurring in the case of variometers of the initially noted type so as to make uniform tuning possible.

This object is in accordance with the invention achieved by providing for the active coil windings which are switched in at low inductivity values, a larger cross-sectional area than for the windings which are switched in at higher inductance values.

The entire variation range can in this manner be covered without any gap, and the quality of the coils forming the incident inductance is at the same time improved by the increased cross-sectional dimensions of the conductors. This is of particular importance in the case of variometers the inductance of which is variable by the action of shunt windings. It must be considered in this connection that the switching in of such shunt windings or short circuiting rings entails a worsening of the quality factor of the coil, such worsening being the more pronounced the firmer the short circuiting windings are intercoupled with the active coil proper. In order to obtain a variation range as great as possible, the coupling must be made as strong as possible. However, a stronger coupling results in reduction of the quality factor of the coil and therefore entails difficulties. The improvement of the quality factor obtained in connection with a variometer according to the invention, due to the windings for the incident or initial inductance which are constructed with larger cross-sectional dimensions, also counteracts the lessening of the quality factor caused by the short circuiting or shunting rings. Moreover, the increase of the cross-sectional dimensions of the windings forming the initial inductance brings about an increase of the current loadability of these conductor parts, thus making the variometer coil constructed according to the present invention particularly suitable for use in connection with high capacity transmitters.

A particularly simple structural shape of the variometer coil according to the invention is obtained upon employing for the windings or turns which form the initial inductance, conductor material with rectangular cross-sectional area, while using cross-sectionally round material for the coil windings which are operatively connected in the case of greater inductance values.

According to another feature of the invention, a further improvement of the quality factor of the coil may be obtained by arranging the first shunt or short-circuiting point at the inductive winding parts in a spacing of a few windings or turns from the last active coil winding.

Further details of the invention will appear from the description of an embodiment which is rendered below with reference to the accompanying drawing, showing in more or less schematic manner a high capacity variometer coil the inductance of which is variable by means of shunt rings and cam switches.

The variometer coil comprises two windings 1 and 2 constructed of relatively wide ribbon-shaped material and a larger number of tubular windings 3 contiguous thereto. The connection between these two winding parts is suitably effected by soldering. Laterally of the coil is arranged a switching shaft 4 provided with cam switches 5 to 10. The connection of the coil is effected by means of the bracket 11 and the switching shaft 4. Interiorly of the coil are provided shunt or short-circuiting rings 12 to 15, the position of which with respect to the coil windings being varied responsive to longitudinal displacement of the shaft 16.

The inductance of the coil is adjustable in stages by the rotation of the switching shaft 4. There are for this purpose provided switching contacts at the cam switches 5 to 10, which are, as seen longitudinally of the switching shaft 4, angularly displaced so that they successively engage the coil windings responsive to rotation of the shaft.

For the setting of the smallest inductance value, the cam switch 5 is by means of its switching contact (not visible in the figure) connected with the winding 1 so that the range between the bracket 11 and the cam switch 5 acts as the active winding. Upon rotating the switching shaft 4, the cam switch 6 will establish engagement with the winding 2, so that the number of active coils now amounts to two. The bridging of the inductance range lying between the rough stages is effected by the actuation of the shunting or short-circuiting rings 12 to 15 with the aid of a shaft 16. A plurality of shunt windings may be used in place of individual shunting rings. The coupling with the shunting rings is strongest when these rings lie parallel to the coil windings, such coupling diminishing upon rotation of the shunt rings incident to actuation of the shaft 16. The coupling increases with growing diameter, but the quality of the coil decreases coincidently. While shunt rings with a diameter as large as possible are desirable for the purpose of obtaining a variation range as large as possible, such desideratum contradicts the requirement to provide for a quality factor which is as high as possible. The use of conductor material with increased cross-sectional dimensions in the range of lowest inductance values, namely, in the case of the windings 1 and 2, raises the quality factor and counteracts at the same time the lowering of the quality factor by the action of the shunt rings. The initial inductance of the coil is likewise reduced and the adjustable inductance range is, as compared with a coil constructed with uniform turns or windings, greater. Such a variometer coil therefore corresponds with respect to variation possibilities to a brush variometer, while avoiding sliding contacts and difficulties connected therewith. There is particularly no frictional wear of the coil windings such as is caused by brush or slide contacts, and the variometer coil constructed according to the invention will therefore reliably provide satisfactory operation for an extended time, without requiring any particular maintenance. The coil is accordingly particularly adapted for use in fully automatic unattended transmitter installations.

Changes may be made within the scope and spirit of the appended claims which define what is believed to be new and desired to have protected by Letters Patent.

I claim:

1. A brushless variometer for continuously variable operation over a large frequency range, comprising a coil having windings, the inductance of which is variable in coarse stages by means of range switches for the operative connection or disconnection of windings, shunt rings disposed in the interior of the coil, and means for supporting said rings for rotative movement to vary the inductance for providing a bridging of the coarse stages, the angle of inclination of the shunt rings, to the coil axis, and therewith to the direction of the magnetic main field being adjustable, the coil windings which initially are operatively connected at smaller inductance values having a greater cross-sectional area than those windings which are additionally operatively connected at higher inductance values.

2. A variometer according to claim 1, wherein the first shunt ring adjacent the additionally connected coil windings is spaced from the last of such additional coil windings.

3. A variometer according to claim 1, wherein said first mentioned, initially connected coil windings are made of flat cross-sectionally rectangular ribbon-like material while said second mentioned, additionally connected coil windings are made of cross-sectionally round material.

4. A variometer according to claim 3, wherein the first shunt ring adjacent the additionally connected coil windings is spaced from the last of such additional coil windings.

References Cited in the file of this patent
UNITED STATES PATENTS 1,989,205     Loughlin _____ Jan. 29, 1935

FOREIGN PATENTS 298,990     Great Britain _____ Aug. 22, 1929